United States Patent
y Escobar et al.

(10) Patent No.: US 7,338,650 B2
(45) Date of Patent: Mar. 4, 2008

(54) METHOD AND DEVICE FOR PROVIDING AT LEAST ONE FUEL, IN PARTICULAR, FOR MOTOR VEHICLE ENGINES

(75) Inventors: Gil Pagkatipunan y Escobar, San Diego, CA (US); Elmar G. Brandschwede, Bonn-Beuel (DE)

(73) Assignee: Gama-Greenol Research & Development Ltd., Vaduz (LI)

( * ) Notice: Subject to any disclaimer, the term of this patent is extended or adjusted under 35 U.S.C. 154(b) by 502 days.

(21) Appl. No.: 10/490,778

(22) PCT Filed: Sep. 25, 2002

(86) PCT No.: PCT/EP02/10739

§ 371 (c)(1),
(2), (4) Date: Oct. 18, 2004

(87) PCT Pub. No.: WO03/029138

PCT Pub. Date: Apr. 10, 2003

(65) Prior Publication Data

US 2005/0042167 A1 Feb. 24, 2005

(51) Int. Cl.
C01B 3/02 (2006.01)
C01B 13/02 (2006.01)
(52) U.S. Cl. .................. 423/658.2; 423/579
(58) Field of Classification Search ........ 423/658.2, 423/657, 658, 579
See application file for complete search history.

(56) References Cited

U.S. PATENT DOCUMENTS 3,907,980 A * 9/1975 Pangborn .............. 423/579
4,080,436 A * 3/1978 Fremery et al. ......... 423/579

FOREIGN PATENT DOCUMENTS

DE 100 30 735 A1 3/2001
EP 0456071 11/1991

OTHER PUBLICATIONS

B. M. Abraham et al, "A Low-Temperature Thermal Process for the Decomposition of Water", SCIENCE, vol. 180, Jun. 1, 1973, pp. 959-960.*

* cited by examiner

Primary Examiner—Wayne A. Langel
(74) Attorney, Agent, or Firm—Friedrich Kueffner (57) ABSTRACT

The invention relates to a method and device (100 or 100') for providing at least one fuel, in particular, for motor vehicle engines. The invention enables fuel to be produced, in particular, in the form of hydrogen, according to needs, and in a simple, economical, clean and safe manner and, furthermore, preferably on-board a means of transportation. According to the invention, at least one mixture consisting of water ($H_2$) and ammonium nitrite ($NH_4NO_2$) and/or ammonium nitrate ($NH_4NO_3$), which serve(s) as a reaction constituent, is introduced as a fuel or fuel mixture into at least one, in particular, second reaction space (40'). In addition, en air (Lu), oxygen ($O_2$) and/or ozone ($O_3$) are supplied to this mixture, which is located in the, in particular, second reaction space (40') and rendered unstable due to charge transfer.

11 Claims, 6 Drawing Sheets

METHOD AND DEVICE FOR PROVIDING AT LEAST ONE FUEL, IN PARTICULAR, FOR MOTOR VEHICLE ENGINES

BACKGROUND OF THE INVENTION

1. Field of the Invention

This invention relates to a method as well as a device for making available at least one fuel, in particular for engines of motor vehicles; in particular this invention relates to a method as well as a device for making available fuel in form of hydrogen.

2. Description of the Related Art

In view of the increasing shortage of the fossil energy carriers ressources and by reason of the more and more pressing becoming necessity of reducing the climatically relevant discharge of carbon dioxide ($=Co_2$=so-called "greenhouse gas") as well as other climatically relevant emissions, hydrogen can be considered as one of the most promising energy carriers of the future.

Hydrogen reacts by direct combustion as well also as in fuel cells with oxygen to pure water and releases by this reaction a high usable energy without emitting carbon dioxide as, for example, carbon containing fossil energy carriers do. This fact makes hydrogen very attractive with respect to a lasting environmentally acceptable energy supply.

During the combustion of hydrogen with air in internal combustion engines and in gas turbines (no pure oxygen), only very low to negligeable emissions develop if the combustion is carried out appropriately. Hydrocarbons and carbon monoxides can, if there are any, only develop in traces, this being due to the combustion of engine oil in the combustion chamber of internal combustion engines. Emissions of nitrogen oxide ($NO_x$) increase exponentially with the combustion temperature and cannot thus be influenced by appropriate process control.

Since now hydrogen offers more freedom than other fuels, a manifest reduction of the nitrogen oxide emissions compared to mineral oils or natural gas is possible as far as a low combustion temperature is achieved (for example with a high lean mixture). Particle and sulphur emissions will be completely avoided, except slight rests originating from the lubricants.

When using hydrogen in fuel cell driving gears with low temperature fuel cells, all the emissions of polluants are completely avoided. As a reaction product by the current production from hydrogen and air oxygen, there only develops demineralized water. The use of hydrogen in fuel cells of higher temperature level causes—compared with conventional heat machines—emissions which are lower as far as by a factor 100.

Combined with water, hydrogen exists, due to the closed water circuit, in unlimited quantity on the planet earth. Thus, differently from the fossil fuels, it cannot come to a ressources shortage of hydrogen.

However, as for hydrogen one has to consider that its making available is not quite simple to realize at places and in situations in which it is just required at all. In this context, so-called hydrogen service stations are proposed again and again at which a means of locomotion, in particular a motor vehicle can be supplied with hydrogen. This being, it must be taken into account that such hydrogen service stations are not common at all, at least nowadays, but on the contrary that they are rather an absolute exception so that this proposal is not accessible at least to a mass market.

Furthermore, one has to consider as to a drive with hydrogen that the carrying along of hydrogen on board the means of locomotion is not only unpractical and expensive, because of the high need of storage volume required, but is also relatively dangerous because it is not safe.

SUMMERY OF THE INVENTION

Starting from the disadvantages and shortcomings depicted above as well as on assessment of the outlined prior art, the aim of this invention is to make available a device for making available fuel, in particular in form of hydrogen, by means of which the fuel, in particular in form of hydrogen, can be produced depending on the needs as well as in a simple, low cost, clean and safe way, namely on board a means of locomotion.

This aim is achieved by a method with the characteristics indicated in claim 1 or in claim 2 or in claim 4 as well by a device with the characteristics indicated in claim 10 or in claim 11 or in claim 13. Preferable configurations and appropriate improvements of this invention are characterized respectively in the subclaims.

According to the teachings of this invention, the making available of the fuel (hereunter the term "fuel" comprises within the scope of this invention also the "fuel mixture"), in particular of the hydrogen ($H_2$) serving as a fuel in such a way that advantageously not only triatomic ozone ($O_3$) and/or catalytically effective ammonia ($NH_3$) are added to the water ($H_2O$) originating from a water tank or water reservoir but also first of all nitrogen oxides ($NO_x$) such as, for example, nitrogen monoxide (NO) or nitrogen dioxide ($NO_2$).

In this context, the nitrogen oxides ($NO_x$) serve for an appropriate multistage catalyzing or a catalytic conversion by which the water ($H_2O$) is brought to an unstable or not stable state or ammonium nitrite ($NH_4NO_2$) and/or ammonium nitrate ($NH_4NO_3$) is dissolved in water ($H_2O$) in a certain concentration preferably adjustable by means of a regulating and control device.

This "very instable" or "very unstable" water, preferably mixed to the easily splittable ammonium nitrite or ammonium nitrate can then be splitted under considerably easier conditions as well as with a minimal expenditure of energy, for example of energy made available by an usual 12 volt car battery, whereby an electrolytic splitting by forming nitrogen ($N_2$), oxygen ($O_2$) and hydrogen (=fuel $H_2$) can be appropriate. This means in other words that the instable water or the instable ammonium nitrite and/or ammonium nitrate is accessible to a corresponding cracking or is very receptive for this cracking.

In order to be able to crack this instable water or this instable ammonium nitrite and/or ammonium nitrate on molecular level in a particularly energy poor way, it can be appropriate according to an inventive improvement of this method to separate the diamagnetic fractions of the instable water or of the instable ammonium nitrite and/or ammonium nitrate from the paramagnetic fractions of the instable water or of the instable ammonium nitrite and/or ammonium nitrate.

In this context, by a diamagnetic substance, we understand a substance, the (dimensionless) relative permeability of which $\mu_r$ is lower than one and the (dimensionless) magnetic susceptibility $\kappa$ ($=\mu_r-1$) of which is lower than one, whereas by a paramagnetic substance we understand a substance, the (dimensionless relative) permeability $\mu_r$ is higher than one or the (dimensionless) magnetic susceptibility $\kappa$ ($=\mu_r-1$) of which is higher than zero.

The expert in the field of the fuel production and of the fuel utilization, in particular in the field of hydrogen production and hydrogen utilization, for example a chemical engineer with technical knowledge in the field of hydrogen drives, will appreciate with respect to this invention in particular that, taking this invention as a basis, there is no longer a need for a volume intensive and thus unpractical, expensive and unsafe keeping and storage of fuel, in particular of hydrogen, on board a means of locomotion; on the contrary, this invention makes it possible to produce the fuel, in particular hydrogen, on demand, this means depending on the concrete need in the required quantity and place like, for example, on board the means of locomotion.

If we take a range of the means of locomotion of approximately one hundred kilometers per liter water as a basis, in a manner essential to the invention, it can be easily seen that the system made available by this invention on the basis of water as a fuel is not only extremely inexpensive but also very safe (in any case safer than the carrying along of motor fuels obtained from fossil energy carriers with a given explosion hazard of the tank content).

In view of the more and more pressing problem of the so-called "greenhouse effect", i.e. of the temperature rise of the earth atmosphere because of carbon dioxide emissions, a further essential advantage of this invention is to be seen in that, if the combustion is carried out appropriately, there practically does not develop any deleterious emission; there results rather only pure water as emission or by-product of the whole procedure so that the described method as well as the described device according to this invention are absolutely "waste gas free" in the sense of pollution free.

As a further improvement made possible by this invention, it should be noted that the locomotion can take place independently of fuel service stations, in particular of hydrogen service stations. Since the fuel necessary for the locomotion, in particular hydrogen, can be produced, according to a particularly inventive improvement, directly and depending on the needs, on board the means of locomotion, a widespread cost intensive infrastructure of refilling stations for the fuel, in particular hydrogen, can be renounced to; on the contrary the making available takes place by means of the compact and safe device for making available fuel, in particular in form of hydrogen, on board.

According to an advantageous configuration of this invention, the device can be integrated into existing production courses and systems of means of locomotion. This being, a revision and modifiying of existing concepts (so-called "reengineering) is in fact possible and, if need be, also necessary. However, the fundamental layout, the design as well as the concept of the existing (four cycle) internal combustion engines can be maintained.

This means in other words that this invention can be applied with respect to the unit operation as well as to the configuration of the device to all types not only of internal combustion engines (from the classic, naturally sucked carburetor system to the high technique computer controlled fuel injection system) but also of turbines. Not least due to this, a broad mass market can be opened up.

In this context, by means of this method and/or by this device, at least as much fuel, in particular hydrogen, is made available so that a (more than) sufficient supply of the internal combustion engine or also of the turbine is guaranteed in any case.

According to an improvement of this method which is essential to the invention as well as of this device, the fuel made available, in particular hydrogen, must not absolutely be immediately utilized, for example burnt; according to this invention, the fuel, in particular hydrogen, can rather be produced also for a temporary keeping and storage, for example in at least one fuel cell, in order to be able to be supplied to its proper destination at a later time.

These options of the keeping and storage do exist also according to the invention for too much fuel produced by means of this method and/or this device, i.e. for excess fuel, in particular hydrogen, produced in the respective use or application.

According to an advantageous configuration of this method as well as of this device, not required liquid constituents can be taken away from the flow of material and be taken back into the circuit. To this, at least one recirculation unit configured as a water trap can be appropriately provided which serves as a kind of filter for all the liquid constituents which are concomitant with the fuel, in particular hydrogen, after the splitting of the instable water. These liquid constituents are collected by this water trap so that it is guaranteed that exclusively fuel, in particular hydrogen gas, and eventually concomittant ammoniac as well as oxygen gas come in the internal combustion engine or in the gas turbine.

In an advantageous improvement, the fuel or the instable water or the ammonium nitrite and/or the ammonium nitrate can be pumped
to at least one fuel cell and/or
to at least one fuel buffer store and/or
to at least one fuel buffer tank or respectively
to at least one second reaction chamber, in particular to at least one converter unit or converter chamber.

Thus, it is guaranteed that the wished fuel quantity, in particular hydrogen quantity, is available at any time so that a potential dying of the internal combustion engine or of the gas turbine can be realiably excluded.

This invention finally relates to the use of the fuel, in particular hydrogen, produced according to the method depicted above and/or by means of the device depicted above, within the scope of mobile applications or within the scope of stationary applications such as, for example
for driving at least one internal combustion engine, for example an Otto engine, a diesel engine, a Wankel engine or the like, assigned to a means of locomotion, in particular a motor vehicle, and/or
for driving at least one gas turbine and/or
for making available as a fuel tank in at least one fuel cell and/or
for heating purposes and/or
for the use in at least one hydrogen burning device.

SHORT DESCRIPTION OF THE DRAWINGS

As already discussed above, there are various possibilities to configure and improve advantageously the teachings of this invention. To this, reference is made on the one hand to the claims subordinate to the claims 1, 2 and 4 as well as 10, 11 and 13, on the other hand further configurations, characteristics and advantages of this invention are explained below with the aid of the embodiments illustrated by the FIGS. 1A to 5.

Like or similar configurations, elements or characteristics are provided in FIG. 1A to 5 with identical reference numbers.

BEST WAY FOR CARRYING OUT THE INVENTION

Figure 1A:
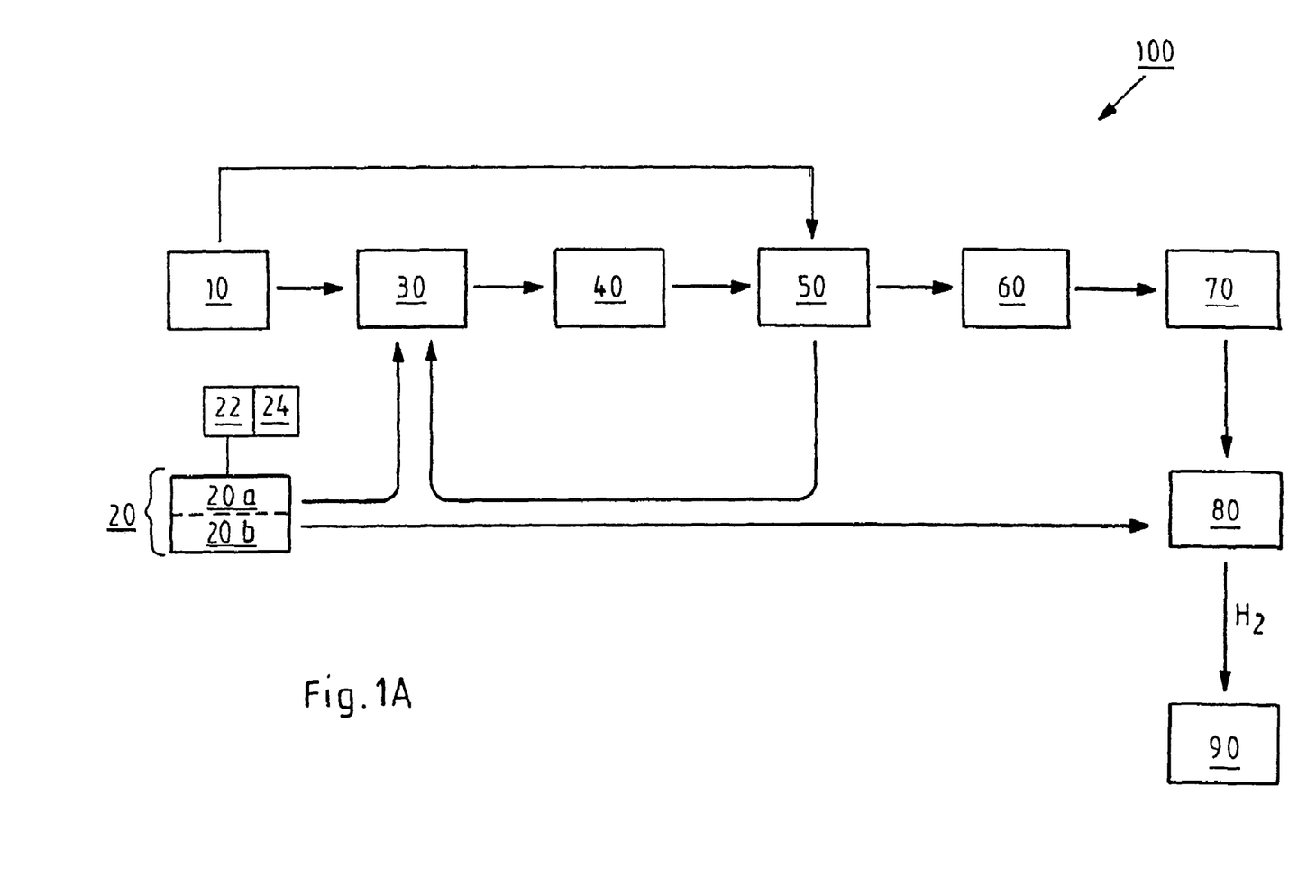
FIG. 1A shows a schematical logic diagram of a first embodiment of a device for making available fuel in form of hydrogen according to this invention.

In FIG. 1A, a first embodiment of a device 100 for making available fuel in form of hydrogen $H_2$ is shown which makes use of the method according to this invention. This device 100 is mounted in a motor vehicle known per se (which is not explicitly represented for more clarity of the representation in FIG. 1A) and serves for supplying this motor vehicle, in particular its internal combustion chamber 90 (so-called combustion chamber) in any operating state with a sufficient quantity of operating means ("fuel", "motor fuel") in form of hydrogen $H_2$.

Figure 2:
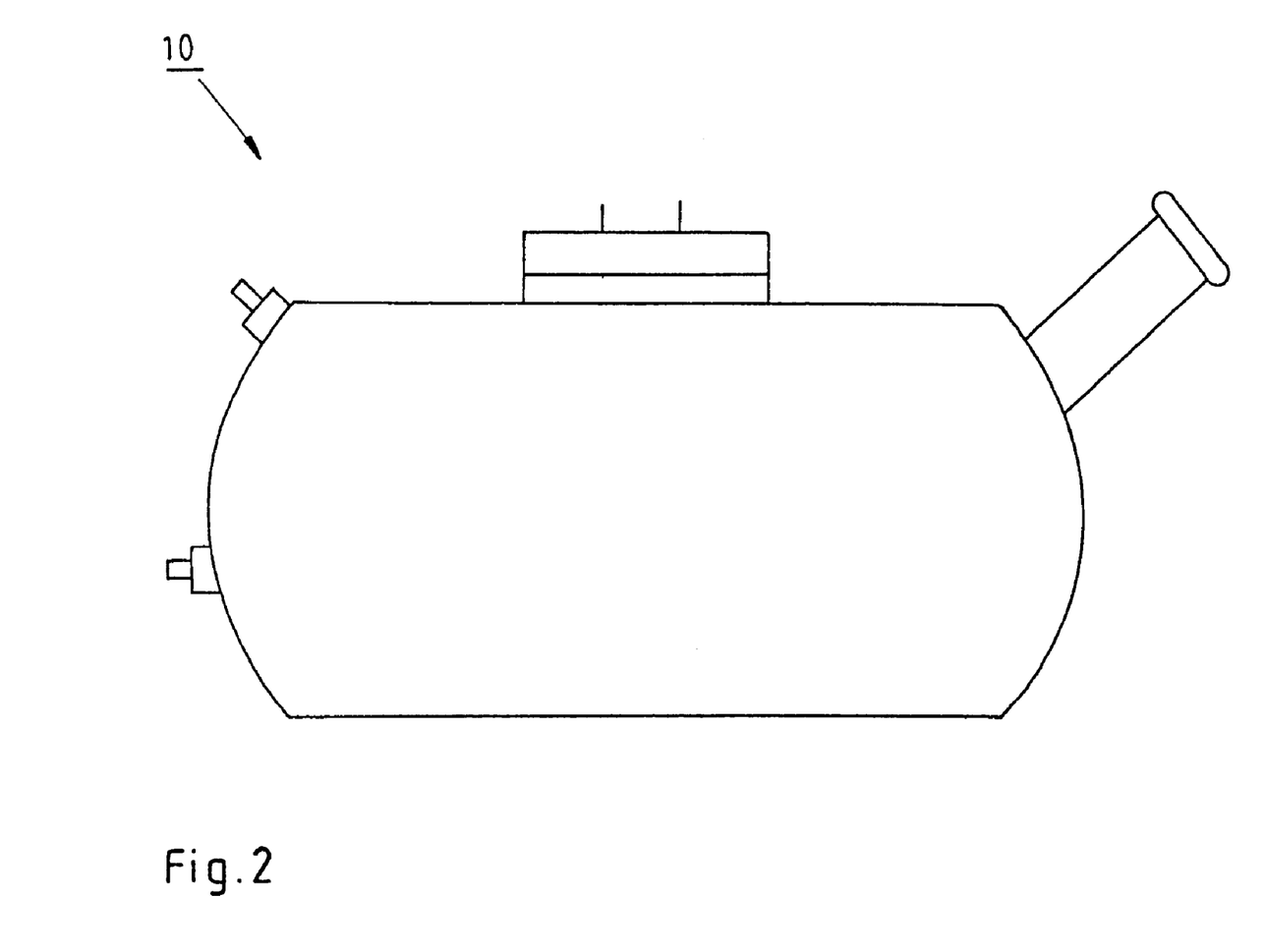
FIG. 2 shows a side view of a water tank unit assigned to the device of FIGS. 1A and 1B.
Figure 4:
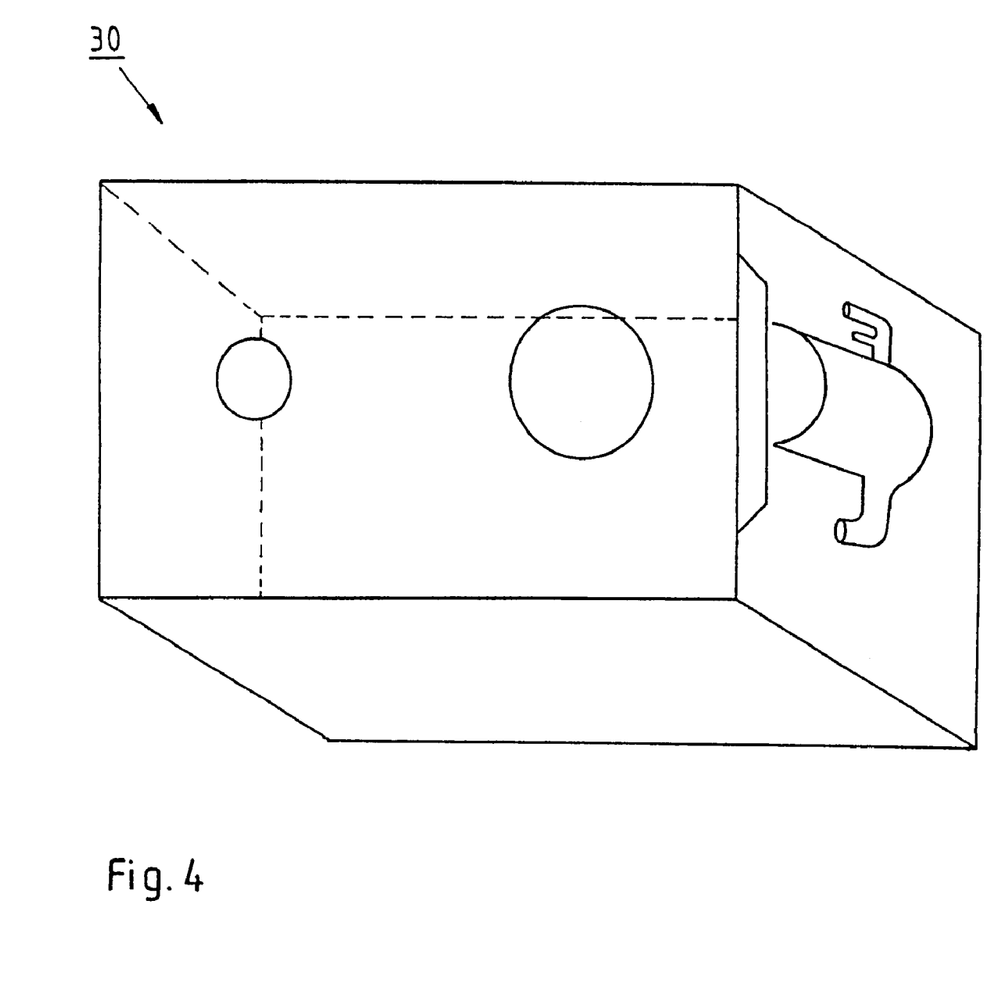
FIG. 4 shows a perspective view of a reaction unit assigned to the device of FIG. 1A.

A water tank unit 10 (so-called $H_2O$ tank, see FIG. 2), which is made of noncorroding material, for example fiber glass or polyethylene or stainless steel, is filled with conventional non treated tap water or with demineralized water; this water $H_2O$ comes into a reaction unit 30 placed behind the water tank unit 10 (so-called reactor, see FIG. 4). Furthermore, nitrogen oxides $NO_x$ such as, for exemple nitrogen monoxide NO or nitrogen dioxide $NO_2$ as well as triatomic ozone $O_3$ are led into this reaction unit.

The nitrogen oxides $NO_x$ as well as the triatomic ozone $O_3$ will be obtained in a gas generator unit 20 (so-called triatomic generator) placed before the reaction unit 30, among others by conversion of atmospheric nitrogen $N_2$ as well as atmospheric oxygen $O_2$. Here, a first stage 20a of the gas generator unit 20 is destined for the fabrication of the nitrogen oxides $NO_x$, in particular of the nitrogen dioxide $NO_2$; a second stage 20b of the gas generator unit 20 serves for fabricating the ozone $O_3$.

An electric switching circuit 22 (so-called triatomic circuit, see FIG. 3) is an integral constituent of the gas generator unit 20, in particular of the first stage 20a of the gas generator unit 20, whereby the fundamental function of this circuit is to be seen in the transformation of a direct current voltage supplied by an energy source 24 (see FIG. 3) with a low voltage which can be switched on by means of a switch 2422, for example in form of a voltage source of for example twelve volt, into a high voltage formed for example in form of rectangular pulses of a range of at least approximately 30000 volt (other configurations of this invention allow also high voltages of a range of less than approximately 30 000 volt).

Figure 3:
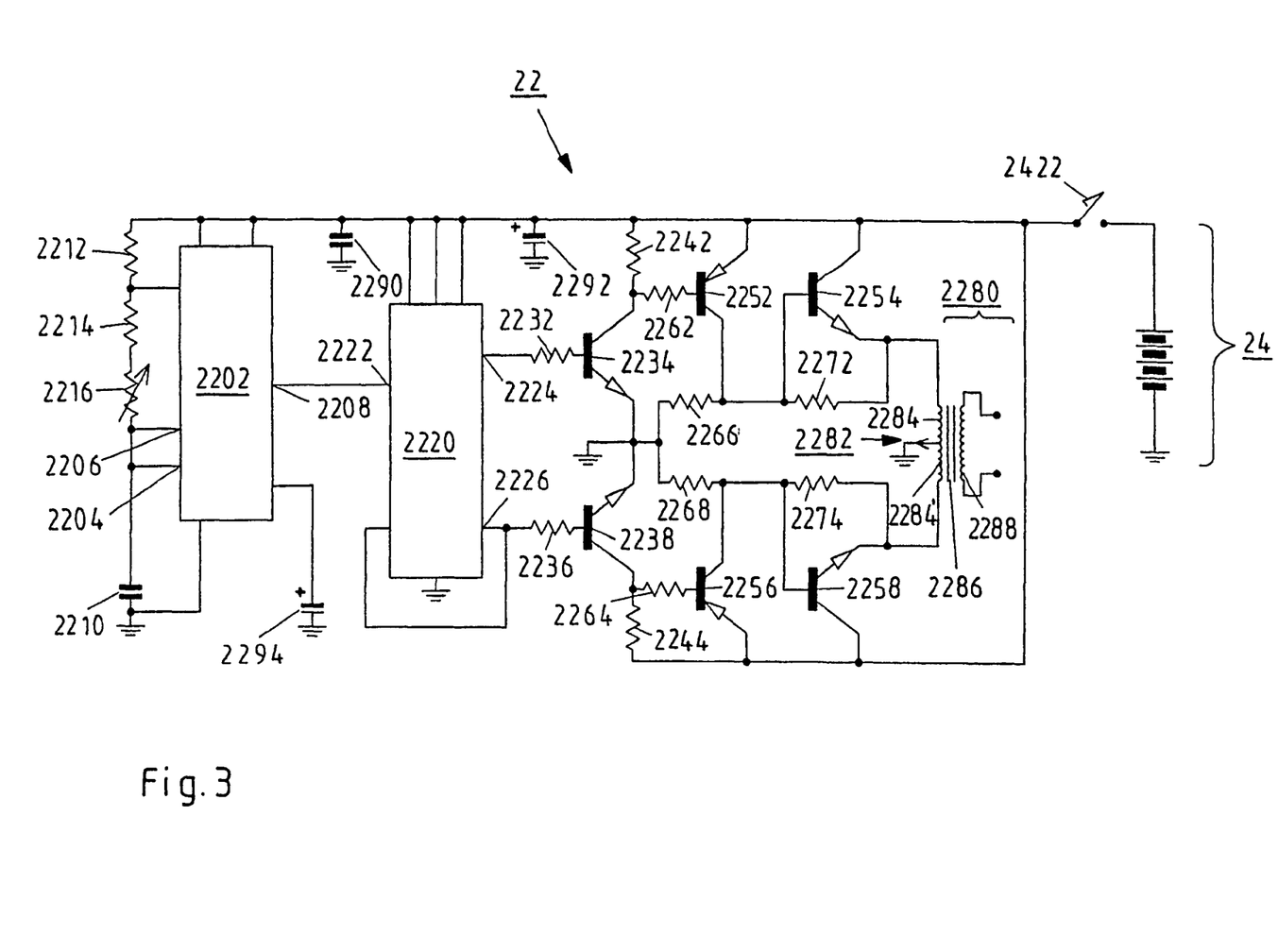
FIG. 3 shows a schematic logic diagramm of an electric switching circuit assigned to the device of FIGS. 1A and 1B, and here in particular to a gas generator unit.

In detail, for this electric switching circuit 22, an astable oscillator is placed around a 555 timer IC (IC=integrated circuit) indicated by the reference numealr 2202. The oscillation frequency is adjusted by means of the capacitor 2210 (exemplary range: 100 nanofarad) as well as by means of three resistors 2212 (exemplary range: 10 kiloohms), 2214 (exemplary range: 27 kiloohms) and 2216 (exemplary range: 100 kiloohms; variable) to 120 Hertz. The output signal assigned to this part of the electric switching circuit 22 is a sequence of rectangular signals with a maximal amplitude in the range of the input or supply voltage of twelve volts.

The function as well as the mode of operation of the oscillator part of the electric switching circuit 22 will be explained in detail below. Directly after charging with the input or supply voltage of twelve volts delivered by the car battery 24, the voltage at the capacitor 2210, the capacity of which can move for example in the range of approximately 01 microfarad, can correspond substantially to the earth potential [the switching in of further capacitors 2290 (exemplary range: 100 nanofarad), 2292 (exemplary range: 222 microfarad) and 2294 (exemplary range: 47 nanofarad) can be seen in FIG. 3].

This voltage will be detected by the time based trigger comparator at the input connection 2204 of the timer 2202 so that an internal flip-flop of the timer 2202 is set, what again results in the fact that the input voltage at the outlet connection 2208 of the timer 2202 increases or remains at the voltage level of the supply voltage of twelve volts.

Subsequently, the discharge transistor is switched off so that the capacitor 2210 can charge over the three resistors 2212 (exemplary range: 10 kiloohms), 2214 (exemplary range: 27 kiloohms) and 2216 (exemplary range: 100 kiloohms). The capacitor 2210 comes nearer by charging in this context to the supply voltage of twelve volts, whereby however, when two thirds of the supply voltage have been reached, i.e. when reaching approximately eight volts, a threshold comparator is activated at the input connection 2206 of the timer 2202.

This results in a reset of the internal flip-flop and the outlet voltage at the outlet connection 2208 of the timer 2202 falls back to the level of the earth potential. The discharge transistor then turns to the conductive state so that the capacitor 2210 discharges over the resistors 2216 and 2214 until the voltage at the capacitor 2210 falls back to approximately one third of the supply voltage, i.e. to approximately four volts; at this level, the trigger comparator switches the outlet connection 2208 of the timer 22202 again into the high state (or into a state close to the supply voltage of twelve volts) and the cycle begins again.

The output signals at the outlet connection 2208 of the timer 2202 are fed to the clock input connection 2222 of a 74C74 D-type flip-flop indicated by the reference number 2220. This integrated circuit has a double function: on the one hand, the frequency of the timer 2202 is halved in "like parts" by the flip-flop 2220 so that an output signal of nominal sixty Hertz develops; on the other hand, the flip-flop 2220 makes two complementary output connections 2224 and 2226 simultaneously available which are required by the subsequent switching circuit.

The part of the subsequent switching circuit to which the output signals of the flip-flop 2220 are fed, consists of buffer transistors 2234 and 2238. In this context, resistors 2232 (exemplary range: 33 kiloohms) or 2236 (exemplary range: 3,3 kiloohms), assigned to the two buffer transistors 2234 or 2238, limit the current conduction to the base of the respective buffer transistors 2234 or 2238 to a safe value. Resistors 2242 (exemplary range: one kiloohm) are as so-called pull-up resistors assigned to the respective collector of the buffer transistors 2234 or 2238.

The outlet signals of the buffer transistors 2234 or 2238 are respectively connected with so-called push-pull transistors which are formed respectively by pairs of transistors 2252, 2254 and/or transistors 2256, 2258. This being, the p-n-p transistors 2252 or 2256 serve as driving transistors 2254 and/or 2258, i.e. the current demand of the main power transistors is covered by the p-n-p transistors 2252 and/or 2256 so that a complete saturation state can be achieved.

The driver current intensities made available by the p-n-p transistors 2252 and/or 2256 can—depending on the charge connected over the output of the inverter—amount up to five amperes. Various appropriately selected resistors 2262 (exemplary range: 49 kiloohms), 2264 (exemplary range: 49 kiloohms), 2266 (exemplary range: 330 ohms), 2268 (exemplary range: 330 ohms) 2272 and 2274 are connected in front of the single transistors 2252, 2254 and/or 2256, 2258, or are switched intermediately or after them.

The transistors 2254 and 2258, which are switched together in the so-called push pull mode, charge alternately the respectively assigned half 2284, 2284' of the primary coil 2282 of a transformer 2280 with current. Alternate current conduction means in this context that the contact to the one transistor 2254 or 2258 is interrupted when the other transistor 2258 or 2254 is just in the complete saturation state (and vice-versa).

Due to this alternate switching of both transistors 2254 and 2258, a magnetic field is generated in the transformer core 2286 in the course of magnetic induction, this magnetic field causing an energy transfer to a secondary coil 2288. Due to the corresponding selection of the ratio of the number of turns of the primary coil 2282 to the number of turns of the secondary coil 2288, a high voltage formed for example in form of rectangular pulses of a range of at least approximately 30000 volt can be taken on the secondary coil.

Air, i.e. as well the starting product atmospheric nitrogen $N_2$ as the starting product atmospheric oxygen $O_2$, passes through a series of electric discharges in the course of high voltage electric arcs which are generated by the high voltage or the range of at least approximately 30000 volt made available by the electric circuit.

This results in the fact that nitrogen $N_2$ is atomized, i.e. splitted and combines with the oxygen atoms by supplying high temperatures according to the equation $$N_2 + O_2 \rightarrow 2NO$$

to nitrogen monoxide (endothermic reaction with $\Delta H=+904$ kilojoule pro mole).

The nitrogen monoxide NO generated in this manner in the gas generator unit 20 oxidises from the air oxygen $O_2$ immedialetly to nitrogen $NO_2$ because of the uneven number of electrons in the NO molecule ($\rightarrow$at least one electron is unpaired) so that finally (besides ozone $O_3$) nitrogen dioxide $NO_2$ arrives in the reaction unit 30; this nitrogen dioxide $NO_2$ is freely soluble in water $H_2O$.

In a second stage 20b of the gas generator unit 20 destined for producing ozone $O_3$, the two biatomic oxygen molecules $O_2$ will be converted by means of cold electric discharge according to the equation $$3O_2 \rightarrow 2O_3$$

in stronger reactive triatomic ozone molecules $O_3$ (endothermic reaction with $\Delta H=+68$ kilogram calories pro mole). The use of ozone $O_3$ produced in that way will still be dealt with in detail below.

In the reaction unit 30, by adding ozone $O_3$, the water $H_2O$ is now set into a state which is to be characterized as instable in particular however because of the catalytic effect of the nitrogen oxides $No_x$, whereby the water $H_2O$, the ozone $O_3$ and the nitrogen oxides $NO_x$ are mixed thoroughly and continuously by means of an appropriate mixing and/or stirring device.

In this context, by the reaction of the water $H_2O$ with the mainly existing nitrogen dioxide $NO_2$, not only hydroxyl ions OH are formed in a manner essential to the invention (namely whereby the nitrogen oxides $NO_x$ take a hydrogen atom $H^+$ from each water molecule $H_2O$) but also a series of nitrogen containing compounds such as, for example, dinitrogen monoxide $N_2O$, nitrous acid $HNO_2$ or nitric acid $HNO_3$; in these nitrogen containing compounds, the nitrogen atom is in low oxidation states.

The nitrogen containing compounds, among them further also nitrogen monoxide NO and dinitrogen dioxide $NO_2$ as nitrogen $N_2$ itself, react with the water $H_2O$ by charge transfer to elementar nitrogen ions (=proton $H^+$) as well as to negatively charged nitrogen peroxide ions $NO_3^-$ for example according to the the following reactions:

$$H_2O + NO_2 \rightarrow 2H^+ + NO_3^-$$

$$H_2O + HNO_2 \rightarrow 3H^+ + NO_3^-$$

$$2H_2O + NO \rightarrow 4H^+ + NO_3^-$$

$$3H_2O + NH_4 \rightarrow 10H^+ + NO_3^-$$

$$5H_2O + N_2O \rightarrow 10H^+ + 2NO_3^-$$

$$6H_2O + N_2 \rightarrow 12H^+ + 2\ NO_3^-$$

The nitrogen containing compounds above can be a product of the reactions of oxygen, nitrogen and hydrogen atoms in the raction unit 30, whereby the ambient conditions such as, for example pressure, temperature and/or electric current conduction, to which the nitrogen containing compounds are exposed, have a significant influence. But the instable water is receptive not only for the influences of pressure, temperature and/or electric current conduction but also for other forces such as, for example, gravitation, magnetism and/or the like, which lead to a molecular cracking.

Since now the nitrogen oxides $NO_x$ are dissolved in the water $H_2O$ originating from the water tank unit 10, the aforesaid reactions can be somehow interpreted as by-products of the chemical reactions. To this purpose, the instable water molecules are splitted in a separation unit 40 (so-called molecule splitter, see FIG. 5) placed behind the reaction unit 30 into oxygen $O_2$ and into the hydrogen $H_2$ acting as a fuel. This being, for splitting the instable water in the separation unit 40 at molecular level, the diamagnetic fractions of the instable water are separated from the paramagnetic fractions of the instable water.

For this at least partially electrolytic splitting or separation step, a source of energy 24, for example in form of voltage source of for example twelve volts, is assigned to the separation unit 40; preferably this source of energy 24 is the same source of energy by means of which the direct voltage to be converted into high potential differences of a range of approximately 30000 volt is made available to the gas generator unit 20 for the electric circuit (so-called triatomic circuit).

Figure 5:
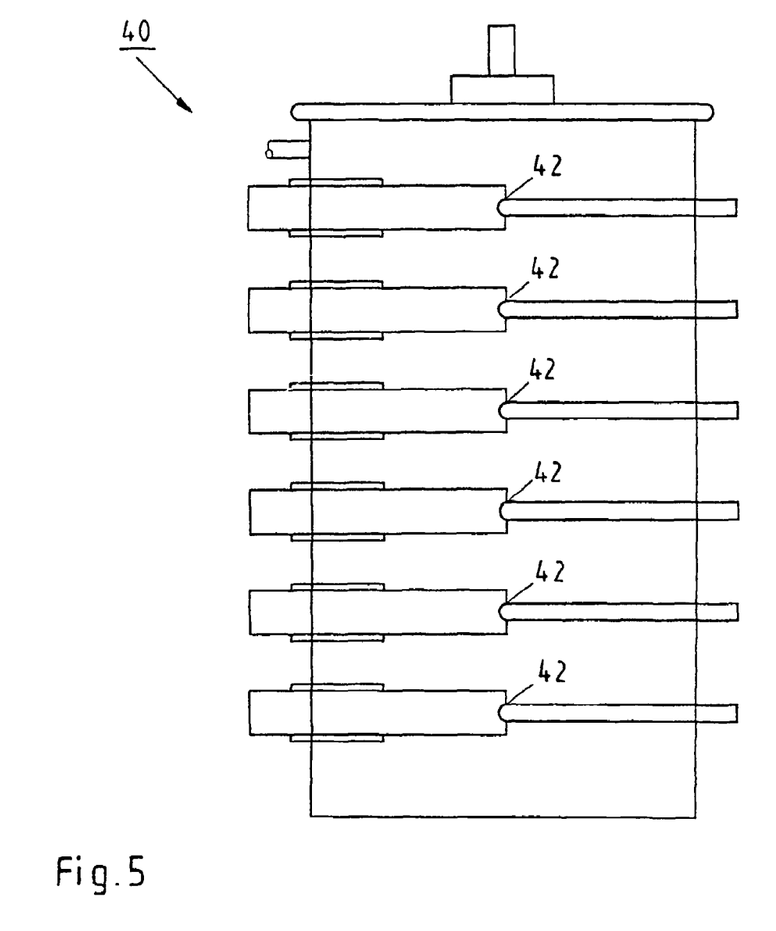
FIG. 5 shows a side view of a separation unit assigned to the device of FIG. 1A.

In order to cause this splitting or cracking, the separation unit 40 has at least two electrodes 42 made for example of aluminium or of copper, the corresponding points of which have only a very small distance from each other, and which are set glowing at temperatures of approximately 1000 degrees Celsius or more by voltage charging by the corresponding source of energy 24 which is for example at least one commercial car battery.

At these temperatures, the ammonia $NH_3$ volatilizes by burning or boiling and the solution mixed with ions remains in which, due to the electric current conduction between the glowing electrode points (which can be compared with an electric arc by welding under water), the molecules are separated into their individual elements. This falls all the more easier than, with this invention, the latent energy of the single instable molecule to be splitted will be overloaded by the transition of the electrons concentrated at the point of the electrode 42 (so-called point effect) so that the dispersion forces (so-called London forces) are overcome. In this way, considerably less energy than conventionally is required for splitting the single molecule.

A recirculation unit 50 (so-called water trap), serving in some way as a filter, provided for withdrawing liquid constituents from the fuel, is placed behind the separation unit 40; by means of this recirculation unit, all the liquid constituents such as for example the nitrogen dioxide $NO_2$, the nitrous acid $HNO_2$ or the nitric acid $HNO_3$ as well as the water $H_2O$ itself can be extracted from the fuel current (=gaseous hydrogen current) and returned to the reaction unit 30.

For this purpose, the recirculation unit 50 is always filled to a relatively constant level with water $H_2O$, whereby due to the carrying off of the liquid constituents such as, for example, nitrogen dioxide $NO_2$, nitrous acid $HNO_2$ or nitric acid $HNO_3$ as well as water $H_2O$ itself, there is a permanent need of the recirculation unit 50 of "fresh" water $H_2O$, as can be seen in the representation of FIG. 1A.

In this way, a durable remaining of the catalytic nitrogen containing constituents in the circuit defined by the reaction unit 30, the separation unit 40 and the recirculation unit 50 is guaranteed; in other words, due to the arrangement of the recirculation unit 50, it is guaranteed thats besides the gaseous fuel $H_2$, exclusively more or less unintentionally remaining gaseous substances, such as ammonia $NH_3$ or oxygen $O_2$, arrive to the combustion chamber 90.

A fuel pump unit 60 (so-called fuel pump) is placed downstream to the recirculation unit 50; by means of this pump unit the fuel can be pumped from the separation unit 40 to a fuel buffer tank 70 (so-called buffer tank) placed downstream to the fuel pump unit 60. Due to this fuel pump unit 60, it is reliably guaranteed that at any time the necessary fuel quantity (=hydrogen quantity) is made available so that a not sufficient supply of the combustion chamber 90 and thus a "dying" of the internal combustion engine (or also of the gas turbine) are avoided.

The above mentioned fuel buffer tank 70 has substantially the same purposes (sufficient supplying of the combustion chamber 90 with fuel and thus avoiding of the dying of the internal combustion engine or of the gas turbine), whereby the gaseous hydrogen $H_2$ transferred from the separation unit 40 can be stored and from which the hydrogen $H_2$ can be requested if need be, i.e. on demand.

The fuel buffer tank 70 acting as an intermediate store has an exemplary maximal content of two hundred milliliters (liquid) hydrogen $H_2$ so that, for a constant hydrogen production, a variation of the number of turns (of the engine) within small limits caused by the combustion chamber is also possible. In this context, the fuel buffer tank 70 has an importance essential for the invention for securing a sufficient supply of the combustion chamber 90 with fuel $H_2$ during an acceleration of the motor vehicle and in higher r.p.m. ranges of the motor vehicle.

A fuel regulating unit 80 which regulates the quantity ratio or mixture ratio of hydrogen $H_2$ fed from the fuel buffer tank 70 and ozone $O_3$ fed from the gas generator unit 20 is placed behind the fuel buffer tank 70 before this mixture enters the combustion chamber 90. This fuel regulating unit 80 is configured, for example, in form of an electronic control in order to adapt the hydrogen production to the hydrogen consumption of the combustion chamber 90; consequently, a "stepping on the gas" is possible for the combustion chamber 90.

It can be seen in the logic diagram of FIG. 1A that the gas generator unit 20 can deliver the ozone $O_3$ not only to the reaction unit 30 but also to a great extent even also to the fuel regulating unit 80; to this purpose, it is advantageous to configure the gas generator unit 20 in two parts or in form of two separate stages 20a, 20b (see FIG. 1A) or of two separate components.

The background of the supply of ozone $O_3$ to the combustion chamber 90 is to be seen, among others, in the fact that by means of the ozone $O_3$—differently from the oxygen $O_2$—a more or less residue free combustion, i.e. in particular waste gas free and polluant free, can take place in the combustion chamber 90 because with the ozone $O_3$ fed from the gas generator unit 20, the gaseous ammonia $NH_3$ carried by the gas flow transporting the energy carrier hydrogen $H_2$ burns (almost) completely to nitrogen $N_2$ and to water $H_2O$.

Moreover, due to the use of the triatomic ozone $O_3$ as an oxidizing agent, the capacity of this device 100 can be considerably increased, not last because the triatomic ozone $O_3$ quicker reacts as biatomic oxygen $O_2$ and secures a higher making available of energy as well as a very low fuel consumption.

Figure 1B:
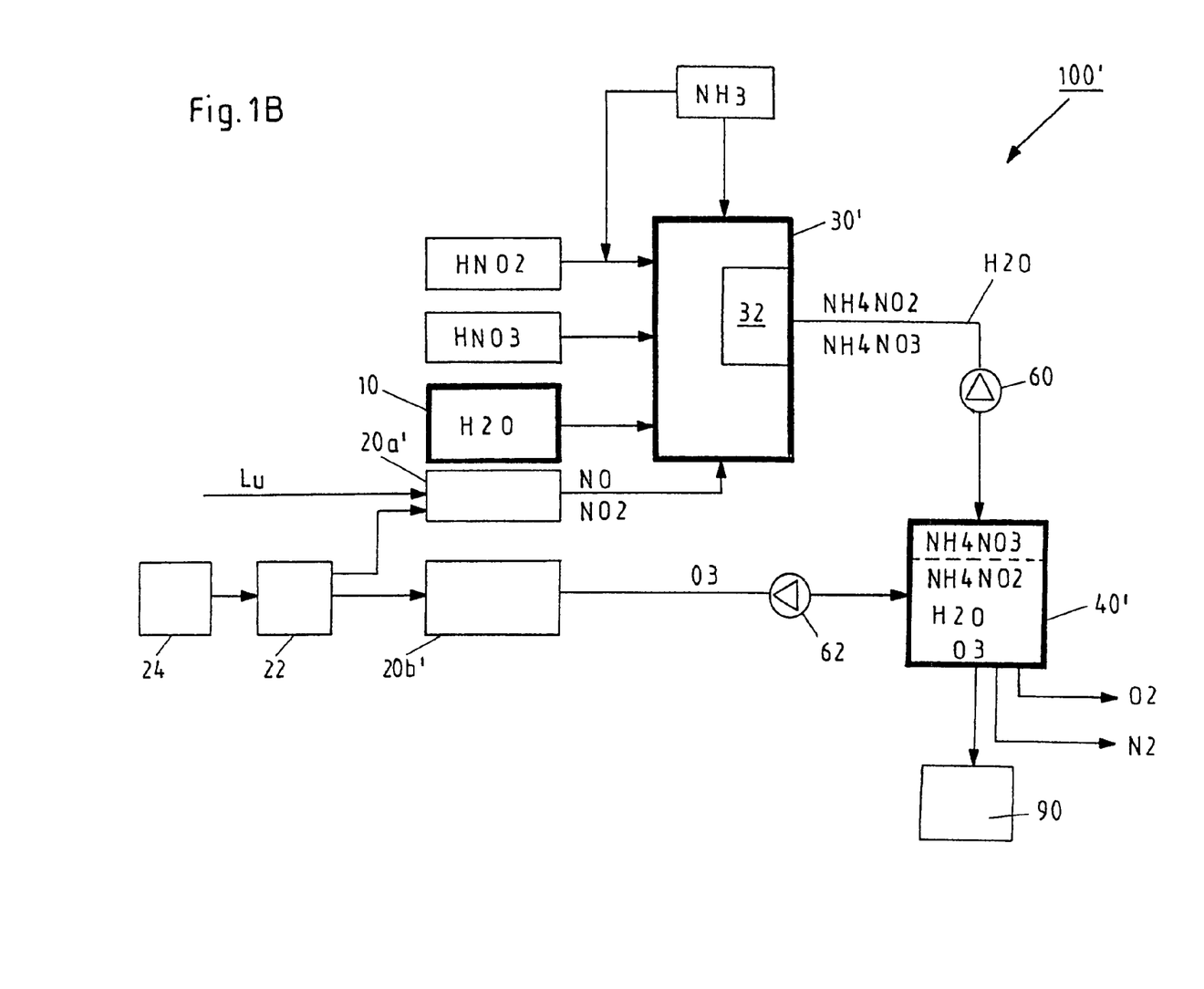
FIG. 1B shows a schematical logic diagram of a second embodiment of a device for making available fuel in form of a fuel mixture according to this invention.

FIG. 1B represents schematically a second embodiment of a device 100' for making available a fuel (mixture) which makes also use of the method according to this invention. As far as not corresponding explanations of the second embodiment of the device 100' according to FIG. 1B are made below, for avoiding unnecessary repetitions concerning the configurations, the elements, characteristics and/or advantages of the second embodiment of the device 100' according to FIG. 1B, reference is made to the corresponding explanations of the first embodiment of the device 100 according to FIG. 1A.

A water tank unit 10 (so-called $H_2O$ tank, see FIG. 2), which is made of noncorroding material, for example of fiber glass or polyethylene or stainless steel, is filled with conventional not treated tap water or demineralized water; this water $H_2O$ arrives into a first reaction chamber 30' placed behind the water tank unit 10. Furthermore, nitrogen oxides $NO_x$ such as, for example nitrogen monoxide NO or above all nitrogen dioxide $NO_2$ as well as nitrous acid $HNO_2$ or nitric acid $HNO_3$ and/or ammonia $NH_3$ are led into this first reaction chamber 30'.

The nitrogen oxides $NO_x$ are obtained in a first chamber 20a' from a gas generator unit 20 (so-called triatomic generator) placed before the first reaction chamber 30', among others by converting atmospheric nitrogen $N_2$ as well as atmospheric oxygen $O_2$ (=catalytic decomposition of air Lu, see FIG. 1B). In this context, it must be taken into account that the nitrogen monoxide NO generated in the gas generator unit 20 is oxidized by atmospheric oxygen $O_2$ immediately to nitrogen dioxide $NO_2$ so that in the first reaction chamber 30' finally nitrogen dioxide $NO_2$ arrives; this nitrogen dioxide $NO_2$ is freely soluble in water $H_2O$.

Alternatively or additionally to the catalytic decomposition of air Lu, the nitrogen-oxygen compound, in particular the nitrogen dioxide $NO_2$, can also be generated by dissociating the nitric acid $HNO_3$ into nitrogen dioxide $NO_2$, into water $H_2O$ and into oxygen $O_2$.

Moreover, ozone $O_3$ is made available by a second chamber 20b' of the gas generator unit 20; however, in the second embodiment of the device 100' according to FIG. 1B, this ozone $O_3$ is not passed into the first reaction chamber 30' but is fed over a pump unit 62 configured as an ozone pump unit directly to a second reaction chamber 40' (which will still be explained below).

With respect to the making available of the nitrogen-hydrogen compound, in particular of the ammonia $NH_3$, according to the invention there is the further option to feed to the first reaction chamber 30' the hydrogen-nitrogen-oxygen compound, in particular the nitrous acid $HNO_2$ and/or the nitric acid $HNO_3$, for forming the ammonia $NH_3$, in particular with the participation of a metal, for example zinc Zn (see FIG. 1B).

By conversion of
the water $H_2O$ originating from the water tank unit 10,
the added nitrous acid $HNO_2$ and/or nitric acid $HNO_3$,
the added catalytically acting ammonia NH3 as well as
the nitrogen oxides $NO_x$, in particular of the nitrogen dioxide $NO_2$, the compound ammonium nitrite $NH_4NO_2$ and/or ammonium nitrate $NH_4NO_3$, which can be characterized as being very instable, is formed. To this purpose, the water $H_2O$, the nitrous acid $HNO_2$ or the nitric acid $HNO_3$ and/or the ammonia $NH_3$ as well as the nitrogen acids $NO_x$, in particular the nitrogen dioxide $NO_2$, are mixed thoroughly and continuously in the first reaction chamber 30' by means of an appropriate mixing and/or stirring device.

Therefore, in the first reaction chamber 30', due to charge transfer, the water $H_2O$ is set into a state which has to be characterized as instable, by reason of the catalytic effect of the nitrogen oxides NOx, in particular of the nitrogen dioxide $NO_2$.

A pump unit 60 is placed behind the first reaction chamber 30', pump unit by means of which the ammonium nitrite $NH_4NO_2$ and/or the ammonium nitrate $NH_4NO_3$ in liquid form, i.e. dissolved in water, can be transported from the first reaction chamber 30' by pumping to the second reaction chamber 40' (so-called fuel converter) placed behind the pump unit 60.

In order to adapt the concentration of the ammonium nitrite $NH_4NO_2$ and/or ammonium nitrate $NH_4NO_3$ in the water $H_2O$ to the fuel needs for example of the engine of a motor vehicle or to vary it depending on the fuel needs, for example of the engine of a motor vehicle, a regulating or control device 32 is assigned to the end of the first reaction chamber 30'.

Due to the pump unit 60 which is made of noncorroding material, for example of fiber glass or of thermoplastic material, it is reliably secured that the necessary quantity of ammonium nitrite $NH_4NO_2$ and/or ammonium nitrate $NH_4NO_3$ is available at any time so that a not sufficient supply of the second reaction chamber 40' (-->as well as of the combustion chamber 90) and thus a "dying" of the internal combustion engine (or also of the gas turbine) are avoided.

Since now, as explained above, the nitrogen oxides $NO_x$ are dissolved in the water $H_2O$, the reactions mentioned above can be interpreted somehow as by-prducts of the chemical reactions. To this, a critical pressure as well as a critical temperature, for example in the range of 150 degrees Celsius to 200 degrees Celsius, is maintained in the second reaction chamber 40' (so-called fuel converter) so that the ammonium nitrite $NH_4NO_2$ and/or ammonium nitrate $NH_4NO_3$ can be converted from the liquid state to the gaseous state, as far as necessary and/or wished.

If the ammonium nitrite $NH_4NO_2$ and/or ammonium nitrate $NH_4NO_3$ is in the second reaction chamber 40', thus in the gaseous state, a mixing with the ozone $O_3$ can take place which is led to the second reaction chamber 40' from the second chamber 20b' of the gas generator unit 20. This being, it can be seen in the logic diagram of FIG. 1B that the second chamber 20b' of the gas generator unit 20 does not deliver the ozone $O_3$ to the first reaction chamber 30' but over the ozone pump unit 62 exclusively to the second reaction chamber 40', to which purpose it is advantageous to configure the gas generator unit 20 in two parts or in form of two separate chambers 20a', 20b' (see FIG. 1B) or of two separate components.

In this procedure stage, the gaseous instable ammonium nitrite $NH_4NO_2$ and/or ammonium nitrate $NH_4NO_3$ is "atomized" now in the second reaction unit 40, i.e. it splits through heating in the second reaction chamber 40' into its elementary constituents nitrogen $N_2$, oxygen $O_2$ (ozone $O_3$) and hydrogen $H_2$ and thus becomes fuel.

This fuel is now fed on carburetor base or by direct injection to the combustion chamber 90 in which, during the proper combustion of the fuel, the ozone $O_3$ reacts exothermally with the hydrogen $H_2$ (combustion explosion); the very stable nitrogen $N_2$ is discharged with the water vapour appearing as a by-product of the combustion through an exhaust.

The background of the supply of ozone $O_3$ to the second reaction chamber 40' is to be seen, among others, in the fact that by means of ozone $O_3$—differently from the oxygen $O_2$—a more or less residue free combustion, i.e. in particular waste gas free and polluant free, can take place in the combustion chamber 90 because with the ozone $O_3$ fed from the gas generator unit 20, the gaseous ammonia $NH_3$ carried by the gas flow transporting the energy carrier hydrogen $H_2$ burns (almost) completely to nitrogen $N_2$ and to water vapour $H_2O$.

Moreover, due to the use of the triatomic ozone $O_3$ as an oxidizing agent, the capacity of this device 100 can be considerably increased, not last because the triatomic ozone $O_3$ quicker reacts as biatomic oxygen $O_2$ and secures a higher making available of energy as well as a very low fuel consumption.

It is also in the scope of the second embodiment of a device 100' according to this invention to burn the produced fuel alternatively or additionally to the ozone $O_3$ with simple atmospheric oxygen $O_2$ and/or with air Lu.

Independently therefrom or combined herewith, it is furthermore within the scope of the second embodiment of a device 100' according to this invention to configure the second reaction chamber 40' and the combustion chamber 90 as one unit or as one part, i.e. to let them coincide spatially. In this case, the produced fuel is then directly fed into the combustion chamber 90 configured as a second reaction unit and is there brought to a detonating gas explosion with air Lu, oxygen $O_2$ and/or ozone $O_3$.

LIST OF REFERENCE NUMERALS

100 Device (first embodiment)
100' Device (second embodiment)
10 Water tank unit
20 Gas generator unit
20a First stage of the gas generator unit 20
20a' First chamber or first part of the gas generator unit 20
20b Second stage of the gas generator unit 20
20b' Second chamber or second part of the gas generator unit 20
22 Electric switching circuit
2202 Timer
2204 Input connection of the timer 2202
2206 Input connection of the timer 2202
2208 Output connection of the timer 2202
2210 Capacitor
2212 Resistor
2214 Resistor
2216 Resistor 2220 Flip-flop
2222 Clock input connection of the flip-flop 2220
2224 Output connection of the flip-flop 2220
2226 Output connection of the flip-flop 2220
2232 Resistor
2234 Buffer transistor
2236 Resistor
2238 Buffer transistor
2242 Resistor
2244 Resistor
2252 p-n-p transistor
2254 Transistor
2256 p-n-p transistor
2258 Transistor
2262 Resistor
2264 Resistor
2266 Resistor
2268 Resistor
2272 Resistor
2274 Resistor
2280 Transformer
2282 Primary coil of the transformer 2280
2284 First half of the primary coil 2282 of the transformer 2280
2284' Second half of the primary coil 2282 of the transformer 2280
2286 Transformer core of the transformer 2290
2288 Secondary coil of the transformer 2280
2290 Capacitor
2292 Capacitor
2294 Capacitor
24 Source of energy, in particular car battery
2422 Switch between electric circuit 22 and source of energy 24
30 Reaction unit
30' First reaction chamber
32 Regulating or control device
40 Separation unit
40' Second reaction chamber
50 Recirculation unit
60 First pump unit, in particular fuel pump unit
62 Second pump unit, in particular ozone pump unit
70 Fuel buffer tank
80 Fuel regulating unit
90 Combustion chamber

The invention claimed is:

1. A method for making available fuel in form of hydrogen ($H_2$), comprising bringing water ($H_2O$) into an unstable state by adding ozone ($O_3$) and using at least one catalyst and splitting this unstable water by forming oxygen and hydrogen acting as fuel.

2. A method according to claim 1, comprising, for splitting the unstable water
   supplying energy, and
   at molecular level, separating the diamagnetic fractions of the unstable water from the paramagnetic fractions of the unstable water.

3. A method for making available fuel in form of hydrogen ($H_2$), comprising bringing water ($H_2O$) into an unstable state conditioned by a charge transfer by adding nitrogen oxide ($NO_x$) and ozone ($O_3$) and splitting this unstable water by forming oxygen ($O_2$) and hydrogen ($H_2$) acting as fuel.

4. A method for making available at least one fuel or at least one fuel mixture, comprising, bringing
   in at least one reaction chamber, at least one mixture of water ($H_2O$) and
   supplying ammonium nitrite ($NH_4NO_2$) or ammonium nitrate ($NH_4NO_3$) acting as reaction component as fuel or fuel mixture and
   supplying air (Lu), oxygen ($O_2$) and ozone ($O_3$) in the reaction chamber to this mixture being in an unstable state due to a charge transfer.

5. A method according to claim 4, comprising adjusting the concentration of the ammonium nitrite ($NH_4NO_2$) or ammonium nitrate ($NH_4NO_3$) in the water ($H_2O$) to a fuel consumption, of at least one engine of a motor vehicle, or regulating or controlling the concentration depending on the fuel consumption of at least one engine of a motor vehicle.

6. A method according to claim 4, comprising mixing in at least another reaction chamber (30') placed before the reaction chamber (40'),
   at least one nitrogen-oxygen compound,
   at least one hydrogen-nitrogen-oxygen compound or at least one nitrogen-hydrogen compound and
   water ($H_2O$) so as to forma a mixture which is in an unstable state due to charge transfer and which acts as fuel or fuel mixture.

7. A method according to claim 6, wherein the nitrogen-oxygen compound is produced
   by dissociation of nitric acid ($HNO_3$) into nitrogen dioxide ($NO_2$), into water ($H_2O$) and into oxygen ($O_2$) or
   by catalytic decomposition of air (Lu).

8. A method according to claim 6, comprising feeding the hydrogen-nitrogen-oxygen compound to the other reaction chamber (30') for forming the nitrogen-hydrogen compound in the presence of at least one metal.

9. A method according claim 4, comprising supplying energy to at least one of the reaction chambers (30', 40').

10. The method according to claim 6, wherein
    the at least one nitrogen-oxygen compound is nitrogen dioxide ($NO_2$), wherein
    the at least one hydrogen-nitrogen-oxygen compound is nitrous acid ($HNO_2$) or nitric acid ($HNO_3$), wherein
    the nitrogen-hydrogen compound is ammonia ($NH_3$).

11. The method according to claim 8, wherein the at least one metal is zinc (Zn).

* * * * *